(12) United States Patent
Voyer et al.

(10) Patent No.: US 8,073,459 B2
(45) Date of Patent: Dec. 6, 2011

(54) METHODS AND DEVICES FOR DETERMINING A LOCATION AREA OF A WIRELESS CELLULAR TELECOMMUNICATION NETWORK

(75) Inventors: Nicolas Voyer, Rennes Cedex (FR); Eric Lavillonniere, Rennes Cedex (FR); Sophie Pautonnier-Perrot, Rennes Cedex (FR); Akira Okubo, Rennes Cedex (FR)

(73) Assignee: Mitsubishi Electric Corporation, Tokyo (JP)

( * ) Notice: Subject to any disclaimer, the term of this patent is extended or adjusted under 35 U.S.C. 154(b) by 1268 days.

(21) Appl. No.: 11/687,987

(22) Filed: Mar. 19, 2007

(65) Prior Publication Data
US 2007/0218881 A1 Sep. 20, 2007

(30) Foreign Application Priority Data

Mar. 20, 2006 (EP) .................................. 06290458

(51) Int. Cl.
*H04Q 7/20* (2006.01)
(52) U.S. Cl. ..................... 455/456.1; 370/328
(58) Field of Classification Search ................ 455/456.2
See application file for complete search history.

(56) References Cited

U.S. PATENT DOCUMENTS

| | | | |
|---|---|---|---|
| 5,875,400 A | 2/1999 | Madhavapeddy et al. | |
| 6,101,388 A | 8/2000 | Keshavachar | |
| 6,272,148 B1 * | 8/2001 | Takagi et al. | 370/469 |
| 7,031,703 B1 * | 4/2006 | Graf et al. | 455/432.1 |
| 7,072,674 B1 * | 7/2006 | Mademann | 455/458 |
| 2003/0143999 A1 | 7/2003 | Funato et al. | |
| 2004/0240392 A1 * | 12/2004 | Han | 370/252 |

OTHER PUBLICATIONS

Claude Castelluccia, et al., "An Adaptive Per-Host IP Paging Architecture", Cornputer Communication Review, vol. 31, No. 5, Oct. 2001, pp. 48-56, XP001115325.

* cited by examiner

*Primary Examiner* — Dwayne Bost
*Assistant Examiner* — Joseph Dean, Jr.
(74) *Attorney, Agent, or Firm* — Oblon, Spivak, McClelland, Maier & Neustadt, L.L.P.

(57) ABSTRACT

The present invention concerns a method for determining a location area of a mobile terminal in a wireless cellular telecommunication network, the mobile terminal being located in a first wireless area of the wireless cellular telecommunication network. The method comprises the steps, executed by a telecommunication device of the wireless cellular telecommunication network, of:

receiving a message from the mobile terminal, obtaining, for each second wireless area of a group of second wireless areas, information related to the probability that the mobile terminal moves into the second wireless area, determining, among the group of second wireless areas, a subset of second wireless areas from the obtained information, the determined subset of second wireless areas being the location area of the mobile terminal. The present invention concerns also the related device.

8 Claims, 6 Drawing Sheets

METHODS AND DEVICES FOR DETERMINING A LOCATION AREA OF A WIRELESS CELLULAR TELECOMMUNICATION NETWORK

The present invention relates to methods and devices for determining a location area of a wireless cellular telecommunication network in which a mobile terminal is located.

A wireless cellular telecommunication network like a mobile telecommunication network, that provides telecommunication services to mobile terminals wandering inside of an area composed of multiple cells of the nodes of the wireless telecommunication network, typically offers means to the mobile telecommunication operator to determine any time which node is serving the mobile terminal in order to enable a communication session establishment with the mobile terminal.

In order to enable the wireless operator to reach the mobile terminal, a centralizing equipment commands the broadcast in each cell of the nodes of a location area of a paging indication in order to know, from the response of the mobile terminal to the paging indication, which node is serving the mobile terminal. Such broadcast consumes a non negligible part of the resources of the wireless telecommunication network.

Typically, the location area needs to be large enough in order to enable the location of the mobile terminal with a certain probability of success and needs, on the opposite side, to have a reduce size in order save the resources of the wireless telecommunication network.

The definition of a location area is a difficult problem and is many times not satisfactory determined. A location area is determined according to radio planning techniques and is set for a long period of time. Such location area is not adapted to each mobile terminal which is located in that location area.

The aim of the invention is therefore to propose methods and devices which make it possible to enable a determination of a location area which is optimised for each mobile terminal of the wireless cellular telecommunication network.

To that end, the present invention concerns a method for determining a location area of a mobile terminal in a wireless cellular telecommunication network, the mobile terminal being located in a first wireless area of the wireless cellular telecommunication network, characterised in that the method comprises the steps, executed by a telecommunication device of the wireless cellular telecommunication network, of:
  receiving a message from the mobile terminal,
  obtaining, for each second wireless area of a group of second wireless areas of the wireless cellular telecommunication network, information related to the probability that the mobile terminal moves into the second wireless area,
  determining, among the group of second wireless areas, a subset of second wireless areas from the obtained information, the determined subset of second wireless areas being the location area of the mobile terminal.

The present invention concerns also a device for determining a location area of a mobile terminal in a wireless cellular telecommunication network, the mobile terminal being located in a first wireless area of the wireless cellular telecommunication network, characterised in that the device is included in a telecommunication device of the wireless cellular telecommunication network, and comprises:
  means for receiving a message from the mobile terminal,
  means for obtaining, for each second wireless area of a group of second wireless areas of the wireless cellular telecommunication network, information related to the probability that the mobile terminal moves into the second wireless area,
  means for determining, among the group of second wireless areas, a subset of second wireless areas from the obtained information, the determined subset of second wireless areas being the location area of the mobile terminal.

Thus, it is possible to determine a location area which is optimised for the mobile terminal of the wireless cellular telecommunication network.

By knowing in which wireless area the mobile terminal is located, it is possible to determine a location area which is dedicated to the mobile terminal.

Furthermore, as the location area is determined according to the information and the wireless area in which the mobile terminal is located, it is no more necessary to have fixed location areas as the ones proposed in the state of the art.

According to a particular feature, the second wireless areas of the group of second wireless areas are located in the vicinity of the first wireless area.

Thus, the determination of the location area is simple and it is not needed to consider a large number of second wireless areas.

According to a particular feature, the probability that the mobile terminal moves into the second wireless area is determined from the number of transitions which have been executed from the first wireless area to the second wireless area and the number of transitions which have been executed from the first wireless area.

Thus, the determination is made from data which are effectively representative of the mobility of the mobile terminals. The determination is then accurate and adapted to the behaviour of the mobile terminal in the wireless cellular telecommunication network.

According to a particular feature, the probability that the mobile terminal moves into the second wireless area is determined by calculating the probability that the mobile terminal moves from the first wireless area, to the second wireless area via another wireless area, named via wireless area.

Thus, the determination is made from data which are effectively representative of the mobility of the mobile terminals. The determination is then more accurate and adapted to the behaviour of mobile terminals in the wireless cellular telecommunication network.

According to a particular feature, the probability that the mobile terminal moves from the first wireless area to the second wireless area via the via wireless area is calculated from the number of transitions which have been executed from the first wireless area to the second wireless area, the number of transitions which have been executed from the first wireless area, the number of transitions which have been executed from the first wireless area to the via wireless area, the number of transitions which have been executed from the via wireless area to the second wireless area and the number of transitions which have been executed from the via wireless area.

Thus, the determination is made from data which are effectively representative of the mobility of the mobile terminals. The determination is then more accurate and adapted to the behaviour of mobile terminals in the wireless cellular telecommunication network.

According to a particular feature, the probability that the mobile terminal moves from the first wireless area to the second wireless area is determined knowing that the mobile terminal has moved from a previous wireless area to the first wireless area, an identifier of the previous wireless area being comprised in the message received from the mobile terminal.

Thus, the determination is made from data which are effectively representative of the mobility of the mobile terminals. The determination is then more accurate and adapted to the behaviour of mobile terminals in the wireless cellular telecommunication network.

According to a particular feature, the probability that the mobile terminal moves from the first wireless area to the second wireless area is the probability that the mobile terminal moves from the first wireless area to the second wireless area via a via wireless area knowing that the mobile terminal has moved from a previous wireless area to the first wireless area.

Thus, the determination is made from data which are effectively representative of the mobility of the mobile terminals. The determination is then more accurate and adapted to the behaviour of mobile terminals in the wireless cellular telecommunication network.

According to a particular feature, the probability that the mobile terminal moves from the first wireless area to the second wireless area via the via wireless area knowing that the mobile terminal has moved from the previous wireless area to first wireless area is determined from the number of transitions which have been executed from the previous wireless area to the first wireless area and followed by a transition from the first wireless area to the second wireless area, the number of transitions which have been executed from the previous wireless area to the first wireless area, the number of transitions which have been executed from the previous wireless area to the first wireless area and followed by a transition from the first wireless area to the via wireless area, the number of transitions which have been executed from the previous wireless area to the first wireless area, the number of transitions which have been executed from the first wireless area to the via wireless area and followed by a transition from the via wireless area to the second wireless area and the number of transitions which have been executed from the first wireless area to the via wireless area.

Thus, the determination is made from data which are effectively representative of the mobility of the mobile terminals. The determination is then more accurate and adapted to the behaviour of mobile terminals in the wireless cellular telecommunication network.

According to a particular feature, the probability that the mobile terminal moves from the first wireless area to the second wireless area is determined from information related to the velocity of the mobile terminal.

Thus, the determination is adapted to the velocity of the mobile terminal.

According to a particular feature, the message received from the mobile terminal comprises plural identifiers of previous wireless areas in which the mobile terminal has moved and the information related to the velocity of the mobile terminal is determined at least from the plural identifiers.

Thus, the information related to the velocity of the mobile terminal is determined simply and doesn't need any frequency shift measurement like Doppler shift measurements.

According to a particular feature, each wireless area is a cell of the wireless cellular telecommunication network.

According to a particular feature, each wireless area comprises plural cells of the wireless cellular telecommunication network.

According to a particular feature, the number of transitions is determined from at least transitions of other mobile terminals.

Thus, the present invention advantageously uses the behaviour of other mobile terminals in order to determine the location area of the mobile terminal.

According to a particular feature, it is transferred to the mobile terminal, the identifiers of the second wireless areas of the group of second wireless areas and for each second wireless area, information related to the probability that the mobile terminal moves into the second wireless area.

Thus the mobile terminal is able to determine by itself the location area.

According to a particular feature, the identifiers of the determined subset of second wireless areas are transferred to the mobile terminal.

According to a particular feature, the telecommunication device is a node of the wireless cellular telecommunication network.

According to a particular feature, the telecommunication device is a centralising device of the wireless cellular telecommunication network.

According to still another aspect, the present invention concerns a method for determining a location area of a mobile terminal in wireless cellular telecommunication network, the mobile terminal being located in a first wireless area of the wireless cellular telecommunication network, characterised in that the method comprises the steps, executed by the mobile terminal, of:

transferring a message to a telecommunication device of the wireless cellular telecommunication network, receiving, in response to the transferred message, a message comprising at least identifiers of second wireless areas of a group of second wireless areas of the wireless cellular telecommunication network, obtaining the location area of the mobile terminal from at least the identifiers of the second wireless areas of the group of second wireless areas.

The present invention concerns also a device for determining a location area of a mobile terminal in a wireless cellular telecommunication network, the mobile terminal being located in a first wireless area of the wireless cellular telecommunication network, characterised in that the device is included in the mobile terminal, and comprises:

means for transferring a message to a telecommunication device of the wireless cellular telecommunication network, means for receiving, in response to the transferred message, a message comprising at least identifiers of second wireless areas of a group of second wireless areas of the wireless cellular telecommunication network, means for obtaining the location area of the mobile terminal from at least the identifiers of the second wireless areas of the group of second wireless areas.

According to a particular feature, the message transferred to the telecommunication device comprises at least an identifier of a wireless area in which the mobile terminal has previously moved.

Thus, the mobile terminal indicates to the telecommunication device information related to its former movements.

According to a particular feature, the message transferred to the telecommunication device comprises the identifier of each wireless area in which the mobile terminal has moved once the mobile terminal has transferred another message to the or another telecommunication device of the wireless cellular telecommunication network.

Thus, the mobile terminal indicates to the telecommunication device information related to its former movements.

According to a particular feature, the location area is determined by selecting the second wireless areas of which the respective identifier is comprised in the received message.

Thus the determination of the location area by the mobile terminal is simplified.

According to a particular feature, the received message comprises, for each identifier of second wireless area, information related to the probability that the mobile terminal moves into said second wireless area.

According to a particular feature, the mobile terminal determines among the identifiers of second wireless areas, a subset of second wireless areas from the information, the selected subset of wireless areas being the location area of the mobile terminal.

According to still another aspect, the present invention concerns computer programs which can be directly loadable into a programmable device, comprising instructions or portions of code for implementing the steps of the methods according to the invention, when said computer programs are executed on a programmable device.

Since the features and advantages relating to the computer programs are the same as those set out above related to the methods and devices according to the invention, they will not be repeated here.

According to still another aspect, the present invention concerns a signal transferred by a telecommunication device of a wireless cellular telecommunication network, the wireless cellular telecommunication network comprising a plurality of wireless areas, a mobile terminal being in a first wireless area, characterised in that the message comprises the identifiers of second wireless areas of the wireless cellular telecommunication network, at least a part of the second wireless areas being the location area of the mobile terminal.

According to a particular feature, the signal is transferred to the mobile terminal and further comprises, for each identifier, information related to the probability that the mobile terminal moves into the second wireless area.

According to still another aspect, the present invention concerns a signal transferred by a mobile terminal in order to enable the determination of a location area of the mobile terminal by a telecommunication device of a wireless cellular telecommunication network, the wireless cellular telecommunication network comprising a plurality of wireless areas, the mobile terminal being in a first wireless area, characterised in that the message comprises the identifiers of wireless areas in which the mobile terminal has moved.

Since the features and advantages relating to the signals are the same as those set out above related to the methods and devices according to the invention, they will not be repeated here.

The characteristics of the invention will emerge more clearly from a reading of the following description of an example embodiment, the said description being produced with reference to the accompanying drawings, among which.

Figure 1:
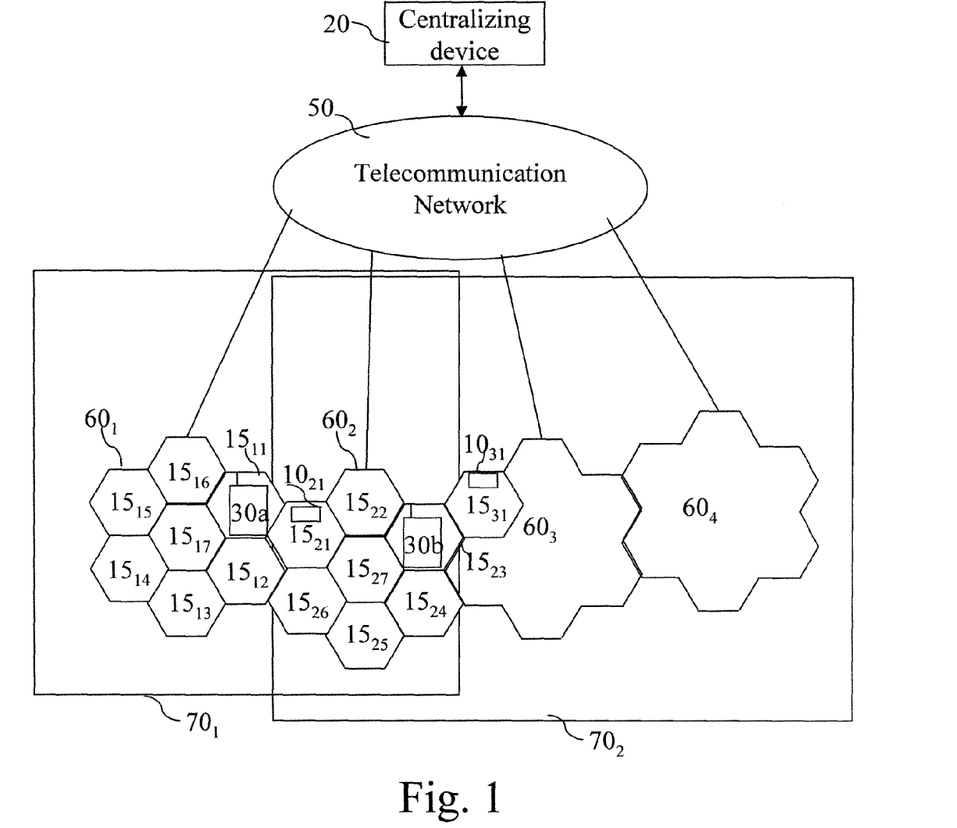
FIG. 1 is a diagram representing the architecture of a wireless cellular telecommunication network in which the present invention is implemented.

In the wireless cellular telecommunication network, a telecommunication device 20, named hereinafter a centralizing device 20 is connected to a plurality of telecommunication devices 10, named hereinafter nodes through a telecommunication network 50.

The telecommunication network 50 is, as example and in a non limitative way, a dedicated wired network, a public network like a public switched network, an IP based network, a wireless network, an Asynchronous Transfer Mode network or a combination of above cited networks.

The telecommunication network 50 connects the nodes 10 together and enables the transfer of messages between the nodes 10 and/or between the nodes 10 and the centralizing device 20 according to the present invention.

According to the invention, the centralizing device 20 maintains, for each mobile terminal 30 of the wireless cellular telecommunication network, a location area which contains plural identifiers of second wireless areas 60 of the wireless cellular telecommunication network inside which the mobile terminal 30 is supposed to be or to move. The centralizing device 20 comprises means for collecting or calculating information related to transitions between each wireless area 60 of the wireless cellular telecommunication network.

When a remote telecommunication device wants to establish a communication with a mobile terminal 30, the centralizing device 20 sends a paging notification message to each node 10 which manages a cell 15 of a wireless area 60 of which the identifier is comprised in the location area corresponding to the mobile terminal 30.

In the FIG. 1, only one centralizing device 20 is shown, but we can understand that a more important number of centralizing devices 20 can be used in the present invention.

The wireless cellular telecommunication network is composed of plural wireless areas $60_1$ to $60_4$.

Each wireless area $60_1$ to $60_4$ is composed of a plurality of cells 15. As example, the wireless area $60_1$ is composed of seven cells noted $15_{11}$ to $15_{17}$. The wireless area $60_2$ is composed of seven cells noted $15_{21}$ to $15_{27}$.

In the wireless area $60_3$, only one cell $15_{31}$ is shown for the sake of clarity, but the wireless area $60_3$ comprises also a more important number of cells 15.

The cells comprised in the wireless area $60_4$ are not represented in the FIG. 1 for the sake of clarity.

Each cell is managed by a node 10. In the FIG. 1, only two nodes noted $10_{21}$, and $10_{31}$ are depicted. The node $10_{21}$ manages the cell $15_{21}$ and the node $10_{31}$ manages the cell $15_{31}$. The other nodes 10 are not shown in the FIG. 1 for the sake of clarity.

According to the invention, the centralizing device 20 maintains, for each mobile terminal 30 of the wireless cellular telecommunication network, a location area 70 which contains a list of identifiers of wireless areas 60 of the wireless cellular telecommunication network. The wireless areas 60 of which the identifier is contained in the assigned location area 70 are the wireless areas inside which the mobile terminal 30 is supposed to be or to move.

When a remote telecommunication device, not shown in the FIG. 1, wants to establish a communication with a mobile terminal 30, the centralizing device 20 sends a paging notification message to each node 10 which manages a cell of a wireless area 60 of which the identifier is comprised in the location area which corresponds to the mobile terminal 30.

In the FIG. 1, only one centralizing device 20 is shown, but we can understand that a more important number of centralizing devices 20 can be used in the present invention.

The location area is preferably determined, as it will disclosed hereinafter, by the node 10 which manages a cell 15 which is currently selected by the mobile terminal 30 or by the node 10 which manages the cell 15 which is currently selected by the mobile terminal 30 and the mobile terminal 30 or by the centralizing device 20 or by the centralizing device 20 and the mobile terminal 30. When a mobile terminal 30 selects a cell 15, the mobile terminal 30 is then considered to be located in the wireless area 60 of which the cell 15 belongs to. When a mobile terminal 30 is located in a wireless area 60, it is considered to be located in the determined location area.

In the FIG. 1, only two location areas $70_1$ and $70_2$ are shown but we can understand that a more important number of location areas 70 are used in the present invention.

According to the invention, a location area 70 is determined for each mobile terminal 30. As example, if plural mobile terminals 30 are located in the same wireless area 60 or cell 15, the present invention determines for each mobile terminal 30 a location area 70 which may differ from the location area determined for the other mobile terminals 30.

According to the example of the FIG. 1, the location area $70_1$ is determined for the mobile terminals 30a and 30b when they are located in the respective wireless areas $60_1$ and $60_2$. The location area $70_1$ comprises two wireless areas $60_1$ and $60_2$.

The location area $70_2$ is determined for the mobile terminal 30b when it enters into the cell $15_{31}$ which doesn't belongs to the cells 15 of the wireless area $60_1$ and $60_2$ of the location area $70_1$. The location area $70_2$ comprises three wireless areas $60_2$, $60_3$ and $60_4$.

Each node 10 of a wireless area 60 memorises the identifiers of the cells 15 of that wireless area 60.

As example, the node $10_{21}$ memorises the identifiers of the cells $15_{21}$ to $15_{27}$ of that wireless area $60_2$.

When a remote telecommunication device wants to establish a communication with a mobile terminal 30, the centralizing device 20 sends a paging notification message to each node 10 which manages a cell 15 of a wireless area 60 of which the identifier is comprised in the location area 70 corresponding to the mobile terminal 30.

The centralizing device 20 comprises means for collecting or calculating the information related to transitions between each wireless area 60 of the wireless cellular telecommunication network.

In the FIG. 1, only one centralizing device 20 is shown, but we can understand that a more important number of centralizing devices 20 can be used in the present invention.

Each node 10 comprises means for determining the number of transitions between the wireless area 60 to which the cell it manages belongs, and the cells of neighbouring wireless areas 60 from messages transferred by mobile terminals 30 after they enter or leave the wireless area 60 to which the cell it manages belongs.

The message transferred by the mobile terminal 30 comprises at least one identifier of a wireless area 60 or at least an identifier of a cell 15 of a wireless area 60 in which the mobile terminal 30 has moved into.

When the mobile terminal 30 executes the first algorithm as disclosed in the FIG. 5, the message transferred by the mobile terminal 30 comprises a list of wireless areas 60 in which the mobile terminal 30 has moved into and is transferred when the mobile terminal 30 transfers a location area update message as it will be disclosed hereinafter.

When the mobile terminal 30 executes the second algorithm as disclosed in the FIG. 7, the message transferred by the mobile terminal 30 comprises a list of cells 15 in which the mobile terminal 30 has moved into and is transferred when the mobile terminal 30 transfers a wireless area update message as it will be disclosed hereinafter.

Each node 10 comprises means for determining information related to transitions between each neighbouring wireless area 60.

Each node 10 comprises means for transferring the determined information related to transitions between each wireless area 60, or the determined number of transitions to the centralizing device 20 or to at least a part of the nodes 10 through the telecommunication network 50. Each node 10 comprises means for transferring a paging indication in the cell it manages, when a paging notification message is received from the centralizing device 20.

In the cellular wireless telecommunication network, each time a mobile terminal 30 selects or move into one cell 15 instead of another cell 15 within the same location area 70, the mobile terminal 30, doesn't transfer a cell reselection message to the node 10 which manages the newly selected cell 15.

Figure 5:
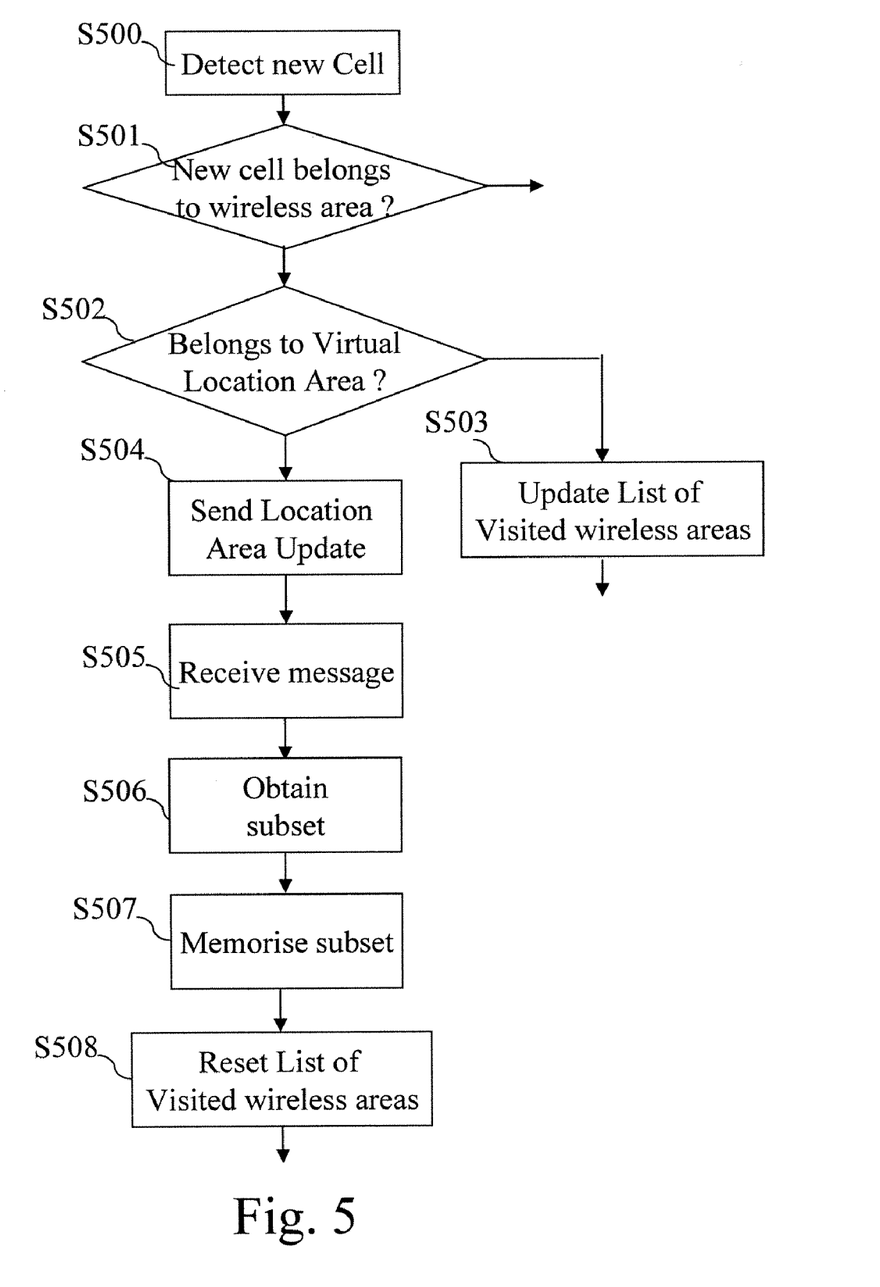
FIG. 5 represents a first algorithm executed by a mobile terminal when it is used in the wireless cellular telecommunication network.

When the mobile terminal 30 executes the first algorithm as disclosed in the FIG. 5, each time a mobile terminal 30, which is in idle mode, moves from one cell 15 of a wireless area 60 of a location area 70 to another cell of another wireless area 60 of the same location area 70, the mobile terminal 30 adds the identifier of the other wireless area 60 in a list of visited wireless areas 60. Later on, when leaving that location area 70, the mobile terminal 30 transfers to the node 10 which manages the newly selected cell, the list of visited wireless areas 60 and resets the list it memorises with the identifier of the new wireless area 60 the newly selected cell 15 belongs to.

Figure 7:
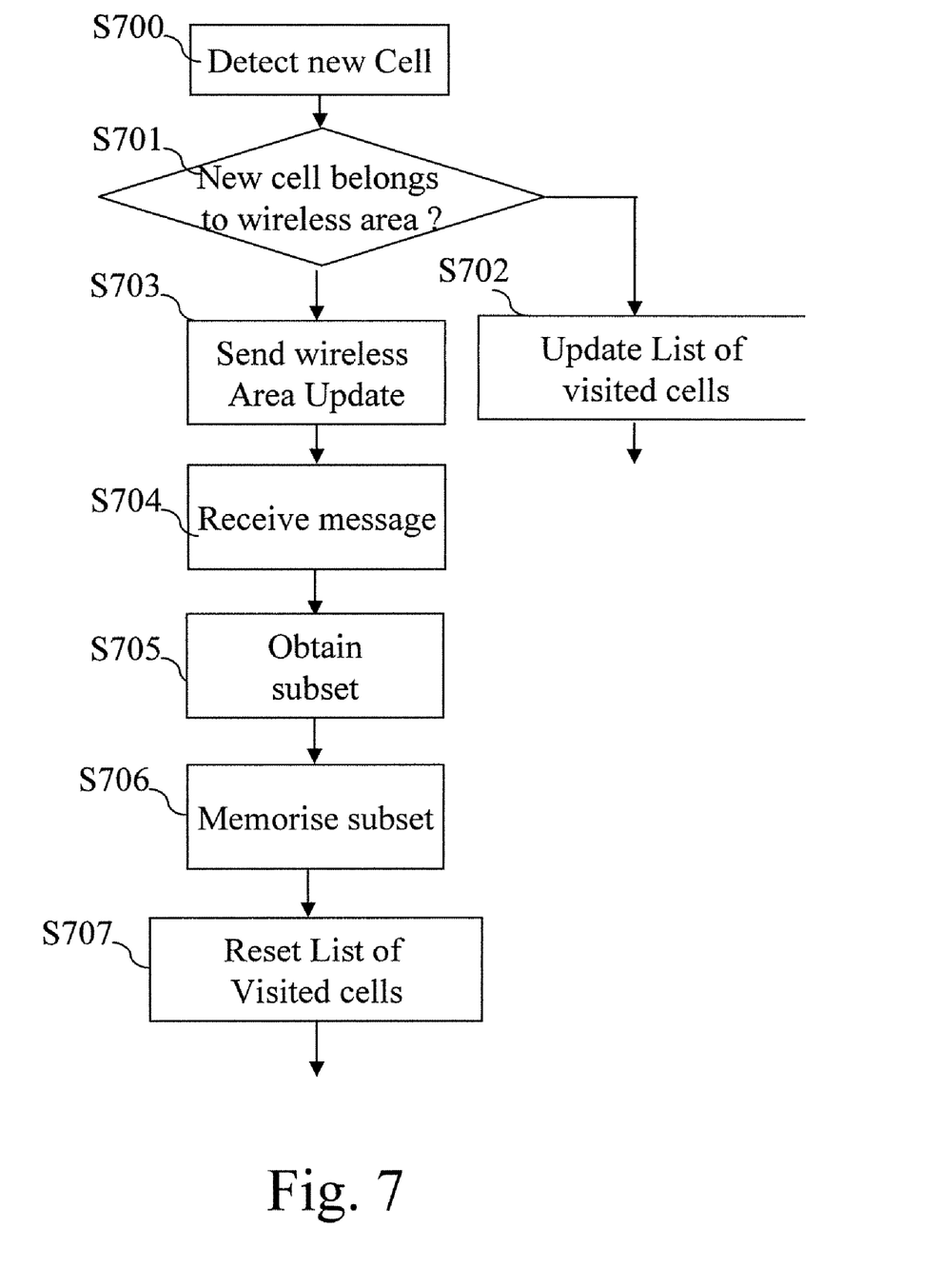
FIG. 7 represents a second algorithm executed by a mobile terminal when it is used in the wireless cellular telecommunication network.

When the mobile terminal 30 executes the second algorithm as disclosed in the FIG. 7, each time a mobile terminal 30, which is in idle mode, moves from one cell 15 of a wireless area 60 of a location area 70 to another cell of the same wireless area 60, the mobile terminal 30 adds the identifier of the other cell 15 in a list of visited cells. Later on, when leaving that wireless area 60, the mobile terminal 30 transfers to the node 10 which manages the newly selected cell 15, the list of visited cells 15 and resets the list it memorises with the identifier of the newly selected cell 15.

Each node 10 comprises means for counting the number of transitions which occur between the cell 15 it is managing and each neighbouring cell 15. A transition between a first and a second cells represents the case where a mobile terminal 30 has selected the first cell 15 and decides to select the second cell 15.

Figure 4:
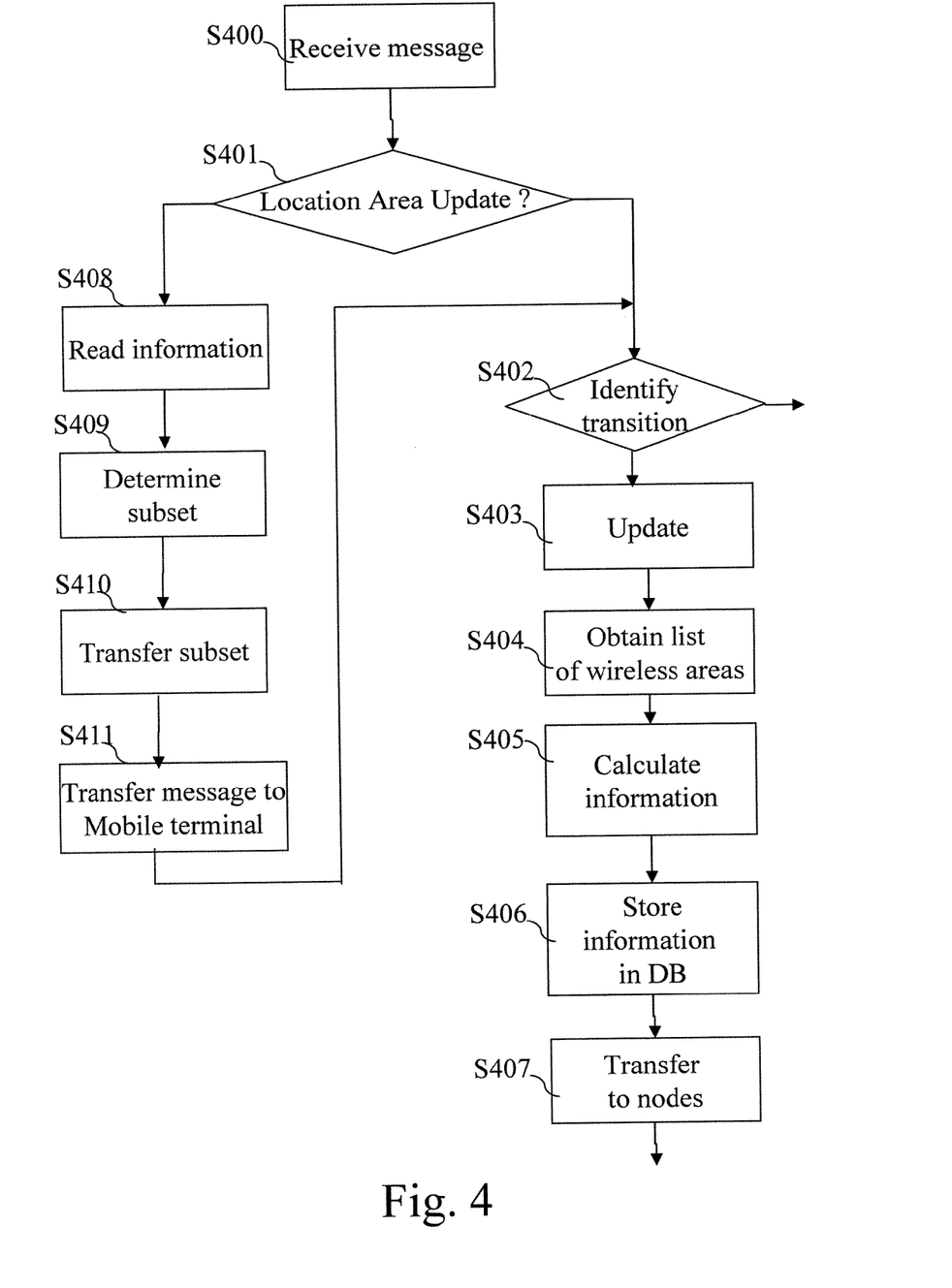
FIG. 4 represents a first algorithm executed by a node in order to determine information related to wireless areas.

When the node 10 executes the first algorithm as disclosed in the FIG. 4, a transition is detected by a node 10 when it receives a location area update message from the mobile terminal 30 or receives a message representative of a handover between the first cell 15 and the second cell 15. Such location area update messages or handover messages are representative of a transition and indicates that the mobile terminal 30 has moved from the first cell 15 to the second cell 15.

Figure 6:
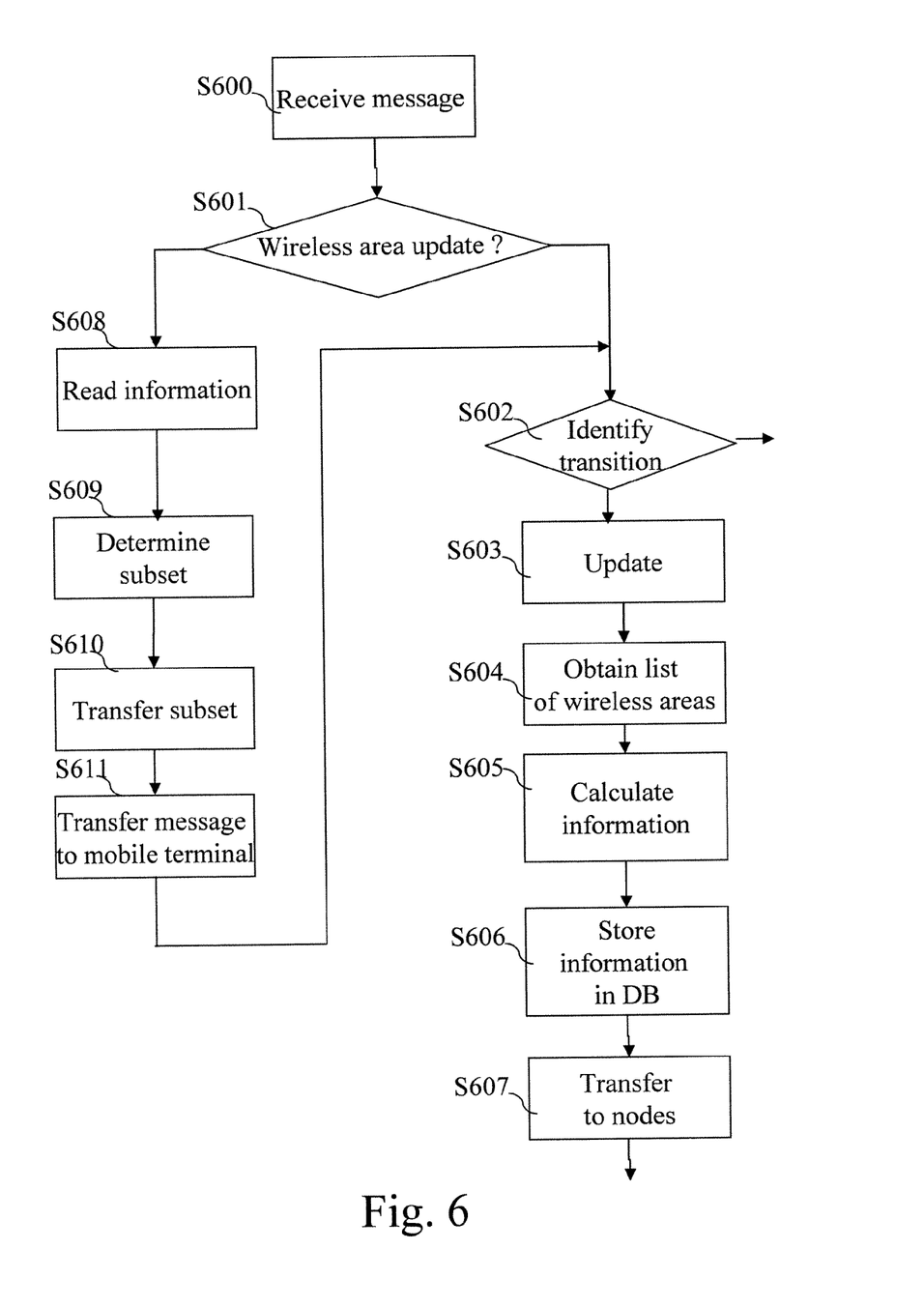
FIG. 6 represents a second algorithm executed by a node in order to determine information related wireless areas.

When the node 10 executes the second algorithm as disclosed in the FIG. 6, a transition is detected by a node 10 when it receives a wireless area update message from the mobile terminal 30 or receives a message representative of a handover between the first cell 15 and the second cell 15. Such location area update messages or handover message are representative of a transition and indicates that the mobile terminal 30 has moved from the first cell 15 of the second cell 15.

Each node 10 comprises means for determining information related to transitions between the cell 15 it manages and each cell 15 which is located in its vicinity. Each node 10 comprises means for transferring the number of transitions, i.e. the number of location area update messages and/or handovers or the number of wireless area update messages and/or handovers which occurred between the cell 15 it manages and each neighbouring cell 15 or for transferring the determined information related to transition between the cell 15 it manages and each cell 15 which is located in its vicinity, to the centralizing device 20 or to at least a part of the nodes 10 through the telecommunication network 50. Each node 10 comprises means for transferring a paging message in the cell 15 it manages when a paging indication message is received from the centralizing device 20.

In the FIG. 1, only two mobile terminals 30a and 30b is shown but we can understand that a more important number of mobile terminals 30 can be used in the present invention.

When the mobile terminal 30 detects a paging indication broadcasted in the cell 15 it has selected or where it is located and which belongs to its location area 70, the mobile terminal 30 becomes aware that there is an incoming call from the wireless cellular telecommunication network. The mobile terminal 30 triggers the establishment of the communication.

Figure 2:
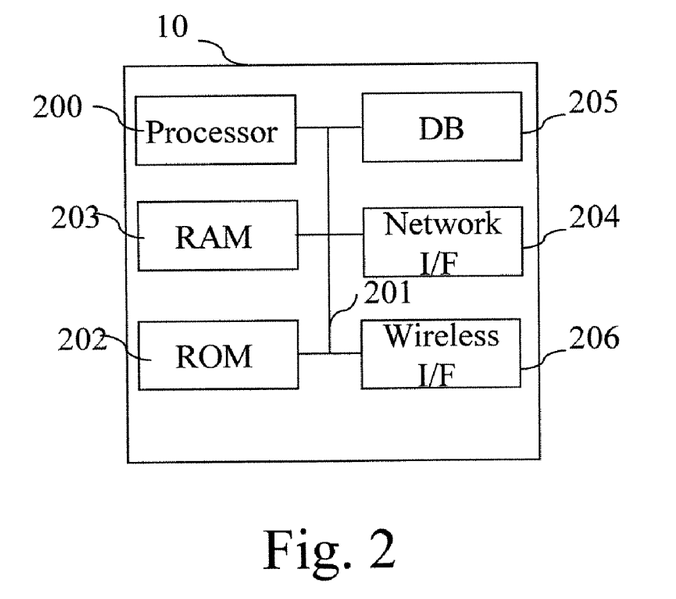
FIG. 2 is a block diagram of a node according to the present invention.

FIG. 2 is a block diagram of a node according to the present invention.

The node 10 has, for example, an architecture based on components connected together by a bus 201 and a processor 200 controlled by the programs as disclosed in the FIGS. 4 and 6.

The bus 201 links the processor 200 to a read only memory ROM 202, a random access memory RAM 203, a database 205, a network interface 204 and a wireless interface 206.

The memory 203 contains registers intended to receive variables, and the instructions of the programs related to the algorithms as disclosed in the FIGS. 4 and 6.

The processor 200 controls the operation of the network interface 204 and the wireless interface 206.

The read only memory 202 contains instructions of the programs related to the algorithms as disclosed in the FIGS. 4 and 6, which are transferred, when the node 10 is powered on to the random access memory 203.

The node 10 is connected to the telecommunication network 50 through the network interface 204. As example, the network interface 204 is a DSL (Digital Subscriber Line) modem, or an ISDN (Integrated Services Digital Network) interface, etc. The communications established or received by the mobile terminals 30 located in the cell 15 managed by the node 10 go through the network interface 204 and the wireless interface 206.

When the node 10 executes the first algorithm as disclosed in the FIG. 4, it receives, through the wireless interface 206, a location area update message from a mobile terminal 30 and transfers to the mobile terminal 30 a list of wireless area identifiers and information related to transition between the wireless area 60 of the selected cell 15 and each wireless area 60 of which an identifier is comprised in the list of wireless area identifiers.

In a variant, when the node 10 executes the first algorithm as disclosed in the FIG. 4, it receives, through the wireless interface 206, a location area update message from a mobile terminal 30 and transfers to the mobile terminal 30, a subset of wireless area identifiers which are comprised in the determined location area of the mobile terminal 30.

When the node 10 executes the second algorithm as disclosed in the FIG. 6, it receives, through the wireless interface 206, a wireless area update message and transfers to the mobile terminal 30 a list of wireless areas identifiers and information related to transition between the wireless area 60 of the selected cell 15 and each wireless area 60 of which an identifier is comprised in the list of wireless areas identifiers.

In a variant, when the node 10 executes the second algorithm as disclosed in the FIG. 6, it receives, through the wireless interface 206, a wireless area update message from a mobile terminal 30 and transfers to the mobile terminal 30, a subset of wireless area identifiers which are comprised in the determined location area of the mobile terminal 30.

In another variant of realisation, the wireless interface 206 comprises means for determining the velocity of the mobile terminal 30 by measuring the frequency Doppler shift of the received signals from the mobile terminal 30.

The node 10 comprises a database DB noted 205 which memorises the number of transitions between the wireless area 15 or 60 it manages and neighbouring wireless areas 60 or cells 15.

The data base 205 memorises the probabilities that the node 10 calculates or receives from the centralizing device 20 or other nodes 10 as it will be disclosed hereinafter in reference to the FIGS. 4 and 6.

Figure 3:
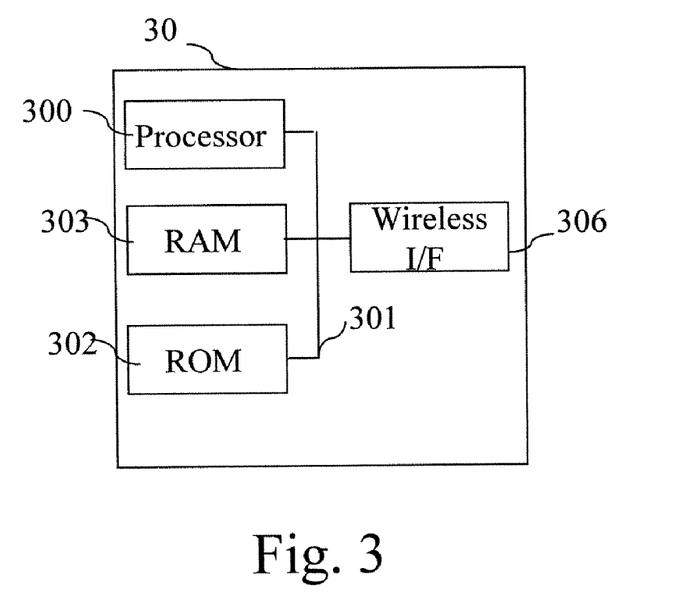
FIG. 3 is a block diagram of a mobile terminal according to the present invention.

FIG. 3 is a block diagram of a mobile terminal according to the present invention.

The mobile terminal 30 has, for example, an architecture based on components connected together by a bus 301 and a processor 300 controlled by the programs as disclosed in the FIG. 5 or 7.

The bus 301 links the processor 300 to a read only memory ROM 302, a random access memory RAM 303 and a wireless interface 306.

The memory 303 contains registers intended to receive variables, and the instructions of the programs related to the algorithms as disclosed in the FIGS. 5 and 7.

The processor 300 controls the operation of the wireless interface 306.

The read only memory 302 contains instructions of the programs related to the algorithms as disclosed in the FIG. 5 or 7, which are transferred, when the mobile terminal 30 is powered on to the random access memory 303.

When the mobile terminal 30 executes the first algorithm as disclosed in the FIG. 5, the mobile terminal 30 transfers location area update messages through the wireless interface 306.

When the mobile terminal 30 executes the second algorithm as disclosed in the FIG. 7, the mobile terminal 30 transfers wireless area update messages through the wireless interface 306.

When the mobile terminal 30 executes the first algorithm as disclosed in the FIG. 5, the mobile terminal 30 receives through the wireless interface 306, a list of wireless area identifiers in combination with information related to transitions between the wireless area 60 of the selected cell 15 and each wireless area 60 from the node 10 which manages the selected cell 15. Through the wireless interface 306, the mobile terminal 30 transfers to the node 10 which manages the selected cell 15 which does not belongs to its location area 70, the list of visited wireless areas 60 it has previously moved into.

In a variant, when the mobile terminal 30 executes the first algorithm as disclosed in the FIG. 5, the mobile terminal 30 receives through the wireless interface 306, a list of wireless area identifiers which are contained in the determined location area according to the present invention.

When the mobile terminal 30 executes the second algorithm as disclosed in the FIG. 7, the mobile terminal 30 receives through the wireless interface 306, a list of wireless area identifiers and cells identifiers in combination with information related to transition between the wireless area 60 of the selected cell 15 and each wireless area 60 from the node 10 which manages the selected cell 15. Through the wireless interface 306, the mobile terminal 30 transfers to the node 10 which manages the selected cell which does not belongs to its location area 70, the list of visited cells 15.

In a variant, when the mobile terminal 30 executes the second algorithm as disclosed in the FIG. 7, the mobile terminal 30 receives through the wireless interface 306, a list of wireless area identifiers which are contained in the determined location area according to the present invention.

The mobile terminal 30 receives also from the wireless interface 306 paging messages.

FIG. 4 represents a first algorithm executed by a node in order to determine information related to wireless areas.

The present algorithm is executed by each node which manages at least a cell of the wireless cellular telecommunication network.

At step S400, the processor 200 of, as example the node $10_{31}$, detects the reception of a message from the wireless interface 206 or from the network interface 204.

Such message is a location area update message transferred by the mobile terminal 30b which has selected the cell $15_{31}$ of the node $10_{31}$, or a message representative of a handover between a source cell of the wireless area $60_3$ and the target cell $15_{31}$ of the node $10_{31}$.

As it will be disclosed hereinafter, the location area update message further comprises a list of identifiers of the wireless areas 60 the mobile terminal 30 has moved into, reflecting several consecutive transitions across different wireless areas 60 of the location area $70_1$ in which it was located previously.

It has to be noted here that, the location area update message comprises a timestamp which indicates the instant when the mobile terminal 30 sent a previous location area update message.

At next step S401, the processor 200 checks if the received message is a location area update message. If the received message is a location area update message, the processor 200 moves to step S408. Else, the processor 200 moves to step S402.

At step S402, the processor 200 checks if the received message is representative of a transition of a mobile terminal 30 across different wireless areas 60. The received message is representative of the transition of a mobile terminal 30 across different wireless areas 60 if the received message is representative of a handover between a cell of a wireless area 60, as example the wireless area $60_2$, which is different from the wireless area $60_3$ of the cell $15_{31}$ it manages, or if the received message is a location area update message, which contains the identifier of at least one wireless area 60 that differs from the wireless area $60_3$ of the cell it manages.

It has to be noted that if the received message is a location area update message and contains a list of identifiers of multiple wireless areas 60, the processor 200 identifies at step S402 multiple transitions across different wireless areas 60.

If at step S402, the message is representative of a transition of a mobile terminal 30 across different wireless areas 60, the processor 200 moves to step S403. Else, the processor 200 returns to step S400 and waits for the reception of a new message.

At step S403, the processor 200 updates information related to transitions between each wireless area 60.

For each transition identified at step S402 in the message received at step S400 between a wireless area noted $60_i$ and another wireless area noted $60_j$, the processor 200 reads a corresponding counter Mij from the database 205, increments the counter Mij and stores the value of Mij in its database 205.

A transition between a wireless area and another wireless area represents the case where a mobile terminal 30 has selected the wireless area and decides to select another wireless area.

It has to be noted here that, in a variant of realisation, plural counters Mij(V) corresponding to different information related to the velocity of mobile terminals are associated to each couple of wireless area 60. The counter Mij(V) corresponding to the same information related to the velocity as the information related to the velocity of the mobile terminal 30 which sent the message is incremented.

The information related to the velocity of the mobile terminal 30 is determined by the wireless interface 206 or is comprised in the received message or is determined by the processor 200 using the list of visited wireless areas identifiers which are representative of a distance and the time elapsed between the reception of the message and the timestamp comprised in the received message.

At next step S404, the processor 200 obtains a list of wireless areas identifiers from the RAM memory 203.

According to a first, a second a third and a fifth modes of realisation of the present invention, the list of wireless areas identifiers comprises the identifiers of the wireless areas 60 which are neighbour of the wireless area 60 of which the cell 15 managed by the node 10 belongs to.

According to a fourth and a sixth modes of realisation of the present invention, the list of wireless areas identifiers comprises the identifiers of the wireless areas 60 which are neighbour of the wireless area 60 of which the cell 15 managed by the node 10 belongs to and the identifiers of the wireless areas 60 which are neighbour of the neighbour wireless areas 60 of the wireless area 60 of the cell 15 managed by the node 10.

At next step S405, the processor 200 calculates, for each identifier comprised in the list of wireless area identifiers, an information related to each wireless area 60.

According to the first mode of realisation of the present invention, the information related to the wireless area is the probability that the mobile terminal 30 moves from the current wireless area $60_{curr}$ to a following wireless area $60_{next}$.

Such information related to the wireless area is calculated according to the following formula:

$$W_{next} = P_{curr,next} = \frac{M_{curr,next}}{M_{curr}}$$

wherein $M_{curr,next}$ is the number of transitions updated at step S403 between the current wireless area $60_{curr}$ and the following wireless area $60_{next}$, $M_{curr}$ is the number of transitions between the cells of the current wireless area $60_{curr}$ and the cells of the neighbour wireless areas 60.

Then, the probability $P_{curr,next}$ that the mobile terminal 30 moves from a cell 15 of the current wireless area $60_{curr}$ to another cell 15 of a following wireless area 60 next is equal to $M_{curr,next}$ normalized by the total number of transition across different wireless areas which have been executed from the current wireless area $60_{curr}$ to the wireless areas 60 which are neighbour of the current wireless area $60_{curr}$.

It has to be noted here that in a variant of realisation of the present invention, the processor 200 obtains information related to the velocity of the mobile terminal 30. The information related to the velocity noted V of the mobile terminal 30 is obtained from the wireless interface 206 or is transferred by the mobile terminal 30 in the message received at step S400 or is determined by the processor 200 using the list of wireless area identifiers and the time elapsed between the reception of the message and the timestamp comprised in the received message.

If the velocity is determined be the processor 200 using the list of wireless area identifiers and the time elapsed between the reception of the message and the timestamp comprised in the received message, the velocity is calculated as example and in a non limitative way according to the following formula:

$$V = N/(t_2 - t_1)$$

wherein N is the number of wireless area identifiers comprised in the received message, $t_1$ is the timestamp comprised in the received message, $t_2$ is instant where the message has been received.

The information related to each wireless area is calculated according to the following formula:

$$W_{next} = P_{curr,next}(V) = \frac{M_{curr,next}(V)}{M_{curr}(V)}$$

wherein $M_{curr,net}(V)$ is the number of transitions, for the mobile terminals 30 which have the same information related to the velocity as the mobile terminal 30, between the cells of the current wireless area $60_{curr}$ and the cells of the following wireless area $60_{next}$, $M_{curr}(V)$ is the number of transitions, for the mobile terminals 30 which have the same information related to the velocity as the mobile terminal 30, between the cells of the current wireless area $60_{curr}$ and the cells of the neighbour wireless areas 60.

According to the second mode of realisation of the present invention, the information related to each wireless area is determined by calculating the probability that the mobile terminal 30 moves from the current wireless area $60_{curr}$ to a following wireless area $60_{next}$ via another wireless area $60_{via}$.

Such information related to the wireless area is calculated according to the following formula:

$$W_{next} = P_{curr,next} + \sigma \Sigma P_{curr,via} P_{via,next}$$

wherein $$P_{curr,next} = \frac{M_{curr,next}}{M_{curr}},$$

σ is a weighting coefficient, $$P_{curr,via} = \frac{M_{curr,via}}{M_{curr}},$$

$$P_{via,next} = \frac{M_{via,next}}{M_{via}},$$

wherein $M_{curr,next}$ is the number of transitions between the cells of the current wireless area $60_{curr}$ and the cells of the following wireless area $60_{next}$, $M_{curr}$ is the number of transitions between the cells of the current wireless area $60_{curr}$ and the cells of the neighbour wireless areas 60.

wherein $M_{curr,via}$ is the number of transitions between the cells of the current wireless area $60_{curr}$ and the cells of the via wireless area $60_{via}$.

$M_{via,next}$ is the number of transitions between wireless areas between the cells of the via wireless area $60_{via}$ and the cells of the via wireless area $60_{next}$, $M_{via}$ is the number of transitions between the cells of the via wireless area $60_{via}$ and the cells of the neighbour wireless areas 60 of the via wireless area $60_{via}$.

$P_{curr,via}$ is the probability that the mobile terminal 30 moves from the current wireless area $60_{curr}$ to the via wireless area $60_{via}$.

$P_{via,next}$ is the probability that the mobile terminal 30 moves from the via wireless area $60_{via}$ to the next wireless area $60_{next}$.

The probability $P_{via,next}$ that the mobile terminal 30 moves from the via wireless area $60_{via}$ to a following wireless area $60_{next}$ is equal to $M_{via,next}$ normalized by the total number of transitions between wireless areas which have been counted from the via wireless area $60_{via}$ to the wireless areas 60 which are neighbour of the via wireless area $60_{via}$.

It has to be noted here that each node 10 which manages a via wireless area $60_{via}$ transfers to the node 10 which manages the cell 15 of the current wireless area $60_{curr}$, the probability $P_{via,next}$.

In a variant of realisation of the present invention, the processor 200 obtains information related to the velocity of the mobile terminal 30 as disclosed in the first mode of realisation of the present invention.

According to that variant of realisation, the number of transitions across wireless areas and the probabilities are determined from mobile terminals 30 which had the same information related to the velocity as the one obtained by the mobile terminal 30.

According to the third mode of realisation, the information related to the wireless area 60 is the probability that the mobile terminal 30 moves from a cell of the current wireless area 60 to a cell of a following wireless area 60 knowing that the mobile terminal 30 has moved from a given previous wireless area $60_{prev}$ to the current wireless area $60_{curr}$.

The processor 200 determines the previous wireless area $60_{prev}$ using the identifier of the previous cell 15 in which the mobile terminal was located. Such identifier is comprised in the message received at step S400, or using the identifier of the previous wireless area comprised in the message received at step S400.

Such information related to the wireless area is calculated according to the following formula: $W_{next} = P_{curr,next} P_{curr,prev}$.

In a variant of realisation of the present invention, the processor 200 obtains information related to the velocity of the mobile terminal 30 as disclosed in the first mode of realisation of the present invention.

According to that variant of realisation, the number of transitions across wireless areas 60 and the probabilities are determined from mobile terminals 30 which had the same information related to the velocity as the one obtained the mobile terminal 30.

According to the fourth mode of realisation, the information related to the neighbouring wireless areas is the probability that the mobile terminal 30 moves from the current wireless area 60 to a following wireless area 60 and the information related to the neighbouring wireless areas 60 of the neighbour areas 60 of the current wireless area is the probability that the mobile terminal 30 moves from a neighbouring wireless area of a neighbour wireless area of the current wireless area.

According to the fifth mode of realisation of the present invention, the information related to each wireless area is determined by calculating the probability that the mobile terminal 30 moves from the current wireless area $60_{curr}$, to a following wireless area $60_{next}$ via other wireless areas $60_{via}$ knowing that the mobile terminal 30 has moved from a given previous wireless area $60_{prev}$ to the current wireless area $60_{curr}$.

Such information related to the wireless area is calculated according to the following formula:

$$W_{next}P_{prev,curr,next} + \sigma \Sigma P_{prev,curr,via} P_{curr,via,next}$$

wherein $$P_{prev,curr,next} = \frac{M_{prev,curr,next}}{M_{prev,curr}},$$

σ is a weighting coefficient, $$P_{prev,curr,via} = \frac{M_{prev,curr,via}}{M_{prev,curr}}, P_{curr,via,next} = \frac{M_{curr,via,next}}{M_{curr,via}}.$$

$M_{prev,curr,next}$ is the number of counted transitions from the previous wireless area to the current wireless area and followed by a transition from the current wireless area to the next wireless area.

$M_{prev,curr}$ is the number of counted transitions from the previous wireless area to the current wireless area.

$M_{prev,curr,via}$ is the number of counted transitions from the previous wireless area to the current wireless area and followed by a transition from the current wireless area to the via wireless area.

$M_{prev,curr}$ is the number of counted transitions from the previous wireless area to the current wireless area.

$M_{curr,via}$ is the number of counted transitions from the current wireless area to the via wireless area.

In a variant of realisation of the present invention, the processor 200 obtains information related to the velocity of the mobile terminal 30 as disclosed in the first mode of realisation of the present invention.

It has to be noted here that in a variant of realisation, the node 10 instead of calculating above mentioned numbers and probabilities, receives from the centralizing device 20 above mentioned numbers and probabilities.

According to a sixth mode of realisation of the present invention, the information related to transitions between each wireless area is determined by calculating the probability that the mobile terminal 30 moves from the current wireless area $60_{curr}$, to a following wireless area $60_{next}$ considering the information related to the velocity of the mobile terminal 30.

The information related to the velocity of the mobile terminal 30 is determined by the wireless interface 206 or is comprised in the received message or is determined by the processor 200 using the list of visited wireless areas identifiers which are representative of a distance and the time elapsed between the reception of the message and the timestamp comprised in the received message.

As example, if the information related to the velocity of the mobile terminal 30 are upper than a first predetermined threshold, the processor 200 sets the information related to the neighbouring wireless areas 60 to a predetermined value and the information related to the wireless areas which are neighbour of neighbouring wireless areas to the same predetermined value.

If the information related to the velocity of the mobile terminal 30 are lower than the first predetermined threshold, the processor 200 sets the information related to the neighbouring wireless areas to a predetermined value and the information related to the wireless areas which are neighbour of neighbouring wireless areas to the another predetermined value which is lower than the predetermined value.

At next step S406, the processor 200 stores the determined information at step S405 into the database 205.

At next step S407, the processor 200 commands the transfer of the determined probabilities to the other nodes 10 that control the other cells 15 comprised in its wireless area 60 and to the other nodes 10 that control the cells 15 of the neighbour wireless areas 60, or to the centralizing device 20.

Then, the processor 200 moves to step S400 and waits for the reception of another message.

If at step S401, it is determined that the received message is a location area update message, the processor 200 moves to step S408.

At step S408, the processor 200 forms a list of identifiers of wireless areas and information related to these wireless areas 60 in the database 205.

According to the first, the second the third and the fifth modes of realisation of the present invention, the identifiers of wireless areas are the identifiers of the wireless area 60 which are neighbour of the wireless area 60 of which the cell managed by the node 10 belongs to.

According to the fourth and the sixth modes of realisation of the present invention, the identifiers of wireless areas are the identifiers of the wireless areas 60 which are neighbour of the wireless area 60 of which the cell managed by the node 10 belongs to and the identifiers of the wireless areas 60 which are neighbour of the neighbour wireless areas 60 of the wireless area of the cell managed by the node 10.

According to the third and fifth modes of realisation of the present invention, the processor 200 reads in the received message the identifier of the last visited wireless area and reads the information related to wireless areas that correspond to the transitions via the wireless area 60 of the cell it manages from the visited wireless areas 60 the mobile terminal 30 moved through.

At next step S409, the processor 200 determines a subset of wireless areas identifiers among the wireless areas identifiers comprised in the list of wireless areas identifiers read at step S408 using the information related to each wireless area of which the identifier is comprised in the list.

As example, the processor 200 determines the subset of wireless area identifiers which have the information related to the wireless area which is upper of a predetermined threshold.

In another example, the processor 200 determines the subset of wireless areas as the ones which have the highest information related to the wireless area.

In another example, the processor 200 determines the subset of wireless areas considering the information related to the velocity of the mobile terminal 30.

At next step S410, the processor 200 transfers the determined subset of wireless areas identifiers to the centralizing device 20. The centralizing device 20 sets that subset of wireless areas cell identifiers to the location area which is assigned to the mobile terminal 30.

At next step S411, the processor 200 commands the transfer of a message to the mobile terminal 30. The message comprises the list of wireless area identifiers and, for each wireless area, the determined information related to the wireless area to the mobile terminal 30.

Preferably, the list of wireless areas identifiers and, for each wireless area 60, the information related to the wireless areas, are continuously broadcasted in each cell 15 of the wireless area 60 to each mobile terminal 30 which is located in the wireless area 60.

If the velocity of the mobile terminal 30 is determined by the node 10, the velocity or the information related to the velocity of the mobile terminal 30 is transferred also to the mobile terminal 30.

It has to be noted here that in a variant of realisation, the list of wireless areas identifiers comprises the identifiers of the wireless areas which are not necessary neighbour of the wireless area of the cell managed by the node 10.

In such case, the probabilities of transitions between wireless areas are transferred by the nodes which manage the cells of these wireless areas or by a centralizing device 20 to the node 10, or by the nodes which manage cells of these wireless areas to the centralizing device 20.

In a variant of realisation, the message transferred at step S411 comprises the determined subset of identifiers at step S409, instead of the list of wireless area identifiers and the information related to these wireless areas to the mobile terminal 30.

It has to be noted here that the step S400 to S411 are in a variant executed by the centralising device 20 instead of the node 10.

FIG. 5 represents a first algorithm executed by a mobile terminal when it is used in the wireless cellular telecommunication network.

At step S500, the wireless interface 306 informs the processor 300 of detection of a new cell with has a given wireless area identifier. The wireless interface 306 detects a new cell 15 when the radio signal power of that cell becomes higher than a threshold, or higher than the radio signal power of previously selected cell 15.

At step S501, the processor 200 checks if the cell newly detected at step S500 belongs to the same wireless area 60 as the one of the cell it was previously located. If the cell newly detected at step S500 belongs to that wireless area 60, the processor 300 returns to step S500, where it waits for another notification from the wireless interface 306. Else, the processor 300 moves to step S502.

At step S502, the processor 300 checks if the identifier of the wireless area belongs to the subset of wireless area identifiers memorised in the RAM memory 303.

If the identifier of the wireless area belongs to the subset of wireless area identifiers, the processor 300 moves to step S503 and adds the identifier of the wireless area of the newly detected cell in the list of visited wireless areas memorised in the RAM memory 303.

If the identifier of the wireless area does not belong to the subset of wireless area identifiers memorised in the RAM memory 303, the processor moves to step S504.

Such case occurs when a mobile terminal 20 is moving from a wireless area 60 of its location area 70 to another wireless area 60 that is not included in its location area 70.

At step S504, the processor 300 commands the transfer of a location area update message to the node 10 which manages the newly detected cell 15. This message is received by the node 10 which manages the newly detected cell 15 at step S400 as disclosed in FIG. 4.

The location area update message transferred by the mobile terminal 30 comprises the mobile terminal's identifier and the identifier of the new cell 15 it has selected and where it is located in or the identifier of the wireless area 60 the selected cell belongs to. The location area update message further comprises the identifier of the wireless area 60 of the cell which was selected by the mobile terminal 30 prior to the selection of the current cell or comprises the identifier of the wireless area 60 of the previously selected cell. The message comprises also in a variant, information related to the velocity of the mobile terminal 30.

The location area update message further comprises the list of visited wireless areas which comprises the identifiers of the wireless areas 60 of the location area 70 where the mobile terminal 30 moved through.

At next step S505, the processor 300 detects the reception, through the wireless interface 306 of one or several messages transferred by the node 10 which manages the selected cell of the new wireless area 60. The received message contains a list of wireless area identifiers and information related to each wireless area 60 which is comprised in the list.

It has to be noted here that, in a variant of realisation, the message is received on the broadcast channel of the wireless interface 306 when the new cell is detected at step S500.

At next step S506, the processor 300 obtains a subset of wireless area identifiers among the wireless area identifiers comprised in the received list of wireless area identifiers using the information related to each wireless area 60 of which the identifier is comprised in the list.

As example, the processor 300 determines the subset of wireless area identifiers which have the information related to the wireless area which is upper of a predetermined threshold.

In another example, the processor 300 determines the wireless areas 60 as the ones which have the highest information related to the wireless areas.

In another example, the processor 300 determines the subset of wireless areas considering the information related to the velocity of the mobile terminal 30 it has received from the node which manages the selected cell or determined by the wireless interface 306.

It has to be noted here that the determined subset of wireless areas is identical to the one determined at step S409 of the FIG. 4.

In a variant of realisation, the received message contains the subset of wireless area identifiers determined by the node 10 at step S409 of the FIG. 4. In such variant, the processor 300 obtains the subset of wireless area identifiers by reading the content of the received message.

At next step S507, the processor 300 memorises the identifiers comprised in the determined subset in the RAM memory 303 and transfers the identifiers comprised in the determined subset to the wireless interface 206.

At next step S508, the processor 300 resets the list of visited wireless areas to the identifier of the wireless area 60 of the newly detected cell.

FIG. 6 represents a second algorithm executed by a node in order to determine information related to the wireless areas.

The present algorithm is executed by each node which manages at least a cell of the wireless cellular telecommunication network.

At step S600, the processor 200 of, as example the node $10_{31}$, detects the reception of a message from the wireless interface 206 or from the network interface 204.

Such message is a wireless area update message transferred by the mobile terminal 30a which has selected the cell $15_{21}$ of the node $10_{21}$, or a message representative of an handover between a source cell of the wireless area $60_2$ and the target cell $15_{21}$ of the node $10_{21}$.

As it will be disclosed hereinafter, the wireless area update message further comprises a list of identifiers of the cells 15 of the wireless area $60_1$ the mobile terminal 30 has moved into, reflecting several consecutive transitions across different cells of the wireless area $60_1$ in which it was located previously.

It has to be noted here that, the wireless area update message comprises a timestamp which indicates the instant when the mobile terminal 30 sent a previous wireless area update message.

At next step S601, the processor 200 checks if the received message is a wireless area update message. If the received message is a wireless area update message, the processor 200 moves to step S608. Else, the processor 200 moves to step S602.

At step S602, the processor 200 checks if the received message is representative of a transition of a mobile terminal 30 across different wireless areas 60. The received message is representative of the transition of a mobile terminal 30 across different wireless areas 60 if the received message is representative of a handover between a cell of a wireless area 60, as example the wireless area $60_1$, which is different from the wireless area $60_2$ of the cell $15_{21}$ it manages, or if the received message is a wireless area update message, which contains the identifier of a wireless area 60 that differs from the wireless area $60_2$ of the cell it manages or which contains the identifier of a cell 15 that doesn't belong to the wireless area $60_2$.

If at step S602, the message is representative of a transition of a mobile terminal 30 across different wireless areas 60, the processor 200 moves to step S603. Else, the processor 200 returns to step S600 and waits for the reception of a new message.

At step S603, the processor 200 updates information related to transitions between the wireless area of the cell managed by the node 10 and the wireless area 60 of at least one cell 15 which identifier is comprised in the message. For each transition identified at step S602 from the message received at step S600 between a wireless area noted $60_i$ and another wireless area noted $60_j$, the processor 200 reads a corresponding counter Mij from the database 205, increments the counter Mij and stores the value of Mij in its database 205.

It has to be noted here that, in a variant of realisation plural counters Mij(V) corresponding to different information related to the velocity of mobile terminals are associated to each couple of wireless areas 60. The counter Mij(V) corresponding to the same information related to the velocity as the information related to the velocity of the mobile terminal 30 which sent the message is incremented.

The information related to the velocity of the mobile terminal 30 is determined by the wireless interface 206 or is comprised in the received message or is determined by the processor 200 using the list of visited cell identifiers which are representative of a distance and the time elapsed between the reception of the message and the timestamp comprised in the received message.

At next step S604, the processor 200 obtains a list of wireless areas identifiers from the RAM memory 203.

According to the first, second, third and fifth modes of realisation of the present invention, the list of wireless areas identifiers comprises the identifiers of the wireless area 60 which are neighbour of the wireless area 60 of which the cell managed by the node 10 belongs to.

According to the fourth and the sixth modes of realisation of the present invention, the list of wireless areas identifiers comprises the identifiers of the wireless areas 60 which are neighbour of the wireless area 60 of which the cell 15 managed by the node 10 belongs to and the identifiers of the wireless areas 60 which are neighbour of the neighbour wireless areas 60 of the wireless area of the cell managed by the node 10.

At next step S605, the processor 200 calculates, for each identifier comprised in the list of wireless area identifiers, an information related to transitions between the wireless area of the cell managed by the node 10 and each wireless area 60.

The processor 200 determines the information related to transitions between the wireless area of the cell managed by the node 10 and each wireless area in the same manner as the one disclosed at the step S405 of the algorithm of the FIG. 4.

More precisely, the processor 200 determines the information related to transitions between the wireless area 60 of the cell 15 managed by the node 10 and each wireless area 60 using the first or second or third or fourth or fifth modes of realisation disclosed at step S405 of the algorithm of the FIG. 4.

According to the sixth mode of realisation of the present invention, the information related to transitions between the wireless area 60 of the cell 15 managed by the node 10 and each wireless area is determined by calculating the probability that the mobile terminal 30 moves from the current wireless area $60_{curr}$ to a following wireless area $60_{next}$ considering the information related to the velocity of the mobile terminal 30.

The information related to the velocity of the mobile terminal 30 is determined by the wireless interface 206 or is comprised in the received message or is determined by the processor 200 using the list of visited cells identifiers which are representative of a distance and the time elapsed between the reception of the message and the timestamp comprised in the received message.

At next step S606, the processor 200 stores the determined information at step S505 into the database 205.

At next step S607, the processor 200 commands the transfer of the determined probabilities to the other nodes 10 that control the cells of its wireless area 60 and to the other nodes 10 that control the cells of the neighbour wireless areas 60, or to the centralizing device 20.

Then, the processor 200 moves to step S600 and waits for the reception of another message.

If at step S601, it is determined that the received message is a wireless area update message, the processor 200 moves to step S608.

At step S608, the processor 200 forms a list of identifiers of wireless areas and information related to these wireless areas 60 in the database 205 as disclosed at the step S408 of the FIG. 4.

At next step S609, the processor 200 determines a subset of wireless areas identifiers among the wireless areas identifiers comprised in the list of wireless areas identifiers read at step S608 using the information related to each wireless area of which the identifier is comprised in the list as disclosed in the step S409 of the FIG. 4.

At next step S610, the processor 200 transfers the determined subset of wireless areas identifiers to the centralizing device 20. The centralizing device 20 sets that subset of wireless areas cell identifiers to the location area which is assigned to the mobile terminal 30.

At next step S611, the processor 200 commands the transfer of a message to the mobile terminal 30. The message comprises the list of wireless area identifiers and, for each wireless area, the determined information related to the wireless area to the mobile terminal 30 as disclosed at step S411 of the FIG. 4.

In a variant of realisation, the message transferred at step S611 comprises the determined subset of identifiers at step S609, instead of the list of wireless area identifiers and the information related to these wireless areas to the mobile terminal 30.

It has to be noted here that the step S600 to S611 are in a variant executed by the centralising device 20 instead of the node 10.

FIG. 7 represents a second algorithm executed by a mobile terminal when it is used in the wireless cellular telecommunication network.

At step S700, the wireless interface 306 informs the processor 300 of detection of a new cell 15 with has a given wireless area identifier. The wireless interface 306 detects a new cell 15 when the radio signal power of that cell becomes higher than a threshold, or higher than the radio signal power of previously selected cell 15.

At step S701, the processor 200 checks if the cell newly detected at step S700 belongs to the same wireless area 60 as the one of the cell it was previously located. If the cell newly detected at step S700 belongs to that wireless area 60, the processor 300 moves to step S702 and adds the identifier of the cell 15 of the newly detected cell 15 in the list of visited cells 15 memorised in the RAM memory 303. The processor 300 returns then to step S700, where it waits for another notification from the wireless interface 306.

If the cell 15 newly detected at step S700 doesn't belongs to that wireless area 60, the processor 300 moves to step S703.

Such case occurs when a mobile terminal 20 is moving from a wireless area 60 to another wireless area 60.

At step S703, the processor 300 commands the transfer of a wireless area update message to the node 10 which manages the newly detected cell 15. This message is received by the node 10 which manages the newly detected cell 15 at step S600 as disclosed in FIG. 6.

The wireless area update message transferred by the mobile terminal 30 comprises the mobile terminal's identifier and the identifier of the new cell 15 it has selected and where it is located in or the identifier of the wireless area 60 the selected cell belongs to. The location area update message further comprises the identifier of the wireless area 60 of the cell 15 which was selected by the mobile terminal 30 prior to the selection of the current cell 15 or comprises the identifier of the previously selected cell 15. The message comprises also in a variant, information related to the velocity of the mobile terminal 30.

The wireless area update message further comprises the list of visited cells 15 which comprises the identifiers of the cells 15 of the wireless area 60 where the mobile terminal 30 moved through.

At next step S704, the processor 300 detects the reception, through the wireless interface 306 of one or several messages transferred by the node 10 which manages the selected cell 15 of the new wireless area 60. The received message is the same as the one disclosed at step S505 of the FIG. 5.

At next step S705, the processor 300 obtains a subset of wireless area identifiers as disclosed at step S506 of the FIG. 5.

It has to be noted here that the determined subset of wireless areas is identical to the one determined at step S609 of the FIG. 6.

In a variant of realisation, the received message contains the subset of wireless area identifiers determined by the node 10 at step S609 of the FIG. 6. In such variant, the processor 300 obtains the subset of wireless area identifiers by reading the content of the received message.

At next step S706, the processor 300 memorises the identifiers comprised in the determined subset in the RAM memory 303 and transfers the identifiers comprised in the determined subset to the wireless interface 206.

At next step S707, the processor 300 resets the list of visited cells to the identifier of the newly detected cell.

Naturally, many modifications can be made to the embodiments of the invention described above without departing from the scope of the present invention.

The invention claimed is:

1. A wireless cellular telecommunication system having one or a plurality of mobile terminals, one or a plurality of nodes and a centralizing device, the mobile terminal, in a wireless area, communicates with the node, each of the nodes manning a cell, the centralizing device being connected to the nodes, the wireless area including the cell or cells, the wireless cellular telecommunication system comprising:

means for checking, at the mobile terminal, if the wireless area that the mobile terminal enters is not in a first list including information related to stored wireless areas, wherein the first list includes the information related to the wireless areas as a form of identifiers for identifying the wireless areas;

means for transmitting a location area update message, at the mobile terminal, in a case where the wireless area is not in the first list, the location area update message including information related to a visited wireless area which it has previously moved into;

means for transmitting a response message, at the centralizing device, as a response to the location area update message, the response message comprising a second list including updated information related to wireless areas, wherein the second list includes the information related to the wireless areas as a form of identifiers for identifying the wireless areas; and means for obtaining the second list from the received response message at the mobile terminal.

2. The wireless cellular telecommunication system according to claim 1, wherein the second list includes a subset of identifiers for identifying the wireless areas.

3. A mobile terminal, the mobile terminal forms a wireless cellular telecommunication system including; one or a plurality of mobile terminals, in a wireless area including a cell or cells, communicating with a node, one or a plurality of the nodes managing the cell, a centralizing device being connected to the nodes, the mobile terminal comprising:

means for checking if the wireless area that the mobile terminal enters is in a first list including information related to stored wireless areas, wherein the first list includes the information related to the wireless areas as a form of identifiers for identifying the wireless areas;

means for transmitting a location area update message in a case where the wireless area is not in the first list, the location area update message including information related to a visited wireless area which it has previously moved into;

means for receiving a response message as a response to the location area update message from the centralizing device, the response message comprising a second list including updated information related to wireless areas, wherein the second list includes the information related to the wireless areas as a form of identifiers for identifying the wireless areas; and means for obtaining the second list from the received response message.

4. A mobile terminal according to claim 3, wherein the second list includes a subset of identifiers for identifying the wireless areas.

5. A method for determining a location area executed by a wireless cellular telecommunication system having one or a plurality of mobile terminals, one or a plurality of nodes and a centralizing device, the mobile terminal, in a wireless area, communicating with the node, each of the nodes managing a cell, the centralizing device being connected to the nodes, the wireless area including the cell or cells, characterized in that the method comprising:

step for checking, at the mobile terminal, if the wireless area that the mobile terminal enters is not in a first list including information related to stored wireless areas, wherein the first list includes the information related to the wireless areas as a form of identifiers for identifying the wireless areas;

step for transmitting a location area update message, at the mobile terminal, in a case where the wireless area is not in the first list, the location area update message including information related to a visited wireless area which it has previously moved into;

step for transmitting a response message, at the centralizing device, as a response to the location area update message, the response message comprising a second list including information related to wireless areas, wherein the second list includes the information related to the wireless areas as a form of identifiers for identifying the wireless areas; and     step for obtaining the second list from the received response message at the mobile terminal.

6. The method according to claim 5, wherein the second list includes the subset of identifiers for identifying the wireless areas.

7. A method for determining a location area in a wireless cellular telecommunication system having one or a plurality of mobile terminals, one or a plurality of the nodes managing one cell or a plurality of cells, a centralizing device being connected to the nodes or the plurality of nodes, one mobile terminal communicating with a node in a wireless area including a cell or cells, characterized in that the method comprises the steps executed by the mobile terminal of:

checking if the wireless area that the mobile terminal enters is in a first list including information related to stored wireless areas, wherein the first list includes the information related to the wireless areas as a form of identifiers for identifying the wireless areas;

transmitting a location area update message in a case where the wireless area is not in the first list, the location area update message including information related to a visited wireless area which it has previously moved into;

receiving a response message as a response to the location area update message from the centralizing device, the response message comprising a second list including updated information related to wireless areas, wherein the second list includes the information related to the wireless areas as a form of identifiers for identifying the wireless areas; and     obtaining the second list from the received response message.

8. The method according to claim 7, wherein the second list includes a subset of identifiers for identifying the wireless areas.

\* \* \* \* \*